UNITED STATES PATENT OFFICE.

WILLIAM GATEWOOD, OF NEWPORT NEWS, VIRGINIA.

FLOATING VESSEL.

1,315,489.  Specification of Letters Patent.  Patented Sept. 9, 1919.

Application filed May 7, 1917. Serial No. 166,991.

*To all whom it may concern:*

Be it known that I, WILLIAM GATEWOOD, a citizen of the United States, residing at Newport News, in the county of Warwick, State of Virginia, have invented a new and useful Improvement in Floating Vessels, of which the following is a specification.

The object of my present invention is to produce a novel construction of hull for floating vessels of all types, wherein I combine lightness of construction with great strength and resistance to all tendencies to bendings or bucklings, to which vessels or any parts thereof are ordinarily subjected.

It is well-known that vessels have been built with longitudinal frames spaced sufficiently close to locally support and stiffen the shell and inner bottom, and with longitudinal beams to locally support the decks; and with transverse frames spaced more widely to support the longitudinal frames and beams; and that a similar construction has been used for stiffening the longitudinal and transverse bulkheads, the closely spaced members being commonly called "stiffeners" and the more widely spaced members being commonly called "webs". But in these constructions, the general practice has been to space the transverse frames at approximately equal distances apart, the exact spacing being arranged to suit the location of bulkheads, hatches, etc. In most cases where this construction has been used, the longitudinal frames are continuous through the transverse frames, which are fitted over or around the longitudinal frames, but are cut for convenience at the bulkheads and the ends bracketed.

Figure 1:
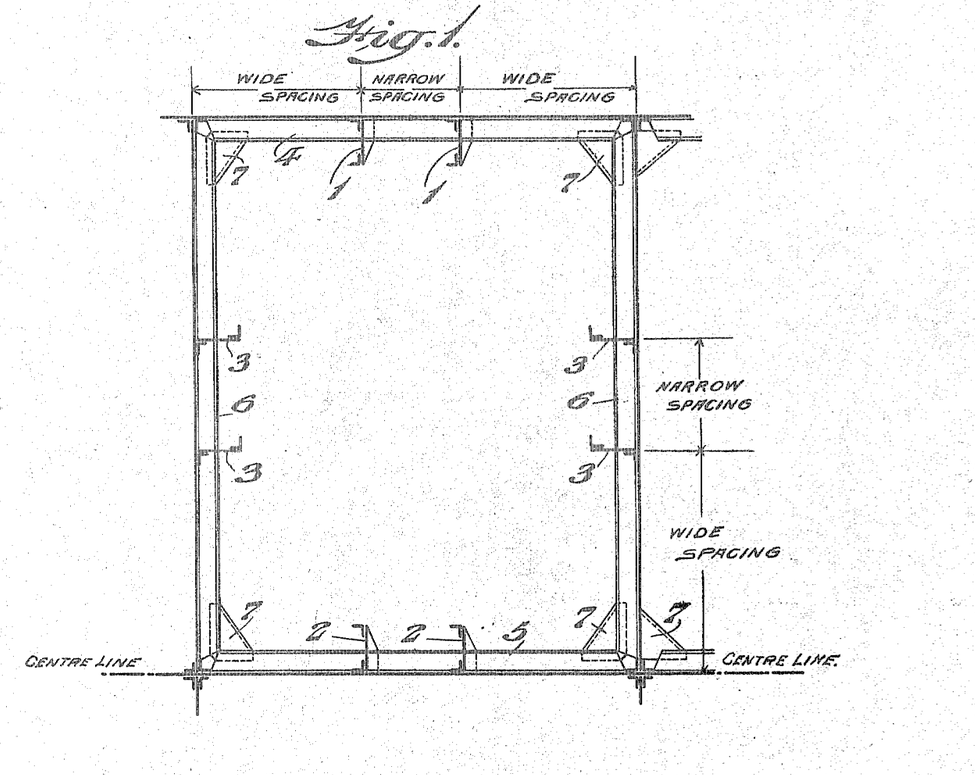
Fig. 1 represents a section taken through a compartment of a vessel built in accordance with my invention, showing two transverses between transverse bulkheads and two webs between shell and centerline bulkhead.

I have discovered that the stresses in the longitudinals may be reduced or the size and weight of the longitudinals decreased by making the spacing between a bulkhead or transverse at which the longitudinal is bracketed and the adjacent transverse, greater than the spacing between transverses at which the longitudinals are not bracketed. Where the spacing of bulkheads is such that only two transverses would be fitted between them, I make the distance between the two transverses less than one-third the distance between the bulk-heads; about one-fourth the distance between the bulkheads will be found a suitable distance, although an even smaller proportionate distance may be used if the end brackets are suitably increased. The same relatively wider spacing may be used on transverse bulkheads between the web which supports the stiffeners and the shell plating or longitudinal bulkhead at which the stiffeners are bracketed. This construction is illustrated in Figure 1.

The mechanical principle on which this construction is based is that where a uniformly loaded beam is continuous over several equally spaced supports, the bending moment at the support is practically double the bending moment midway between supports, and increases as the square of the distance between the supports.

Figure 9:
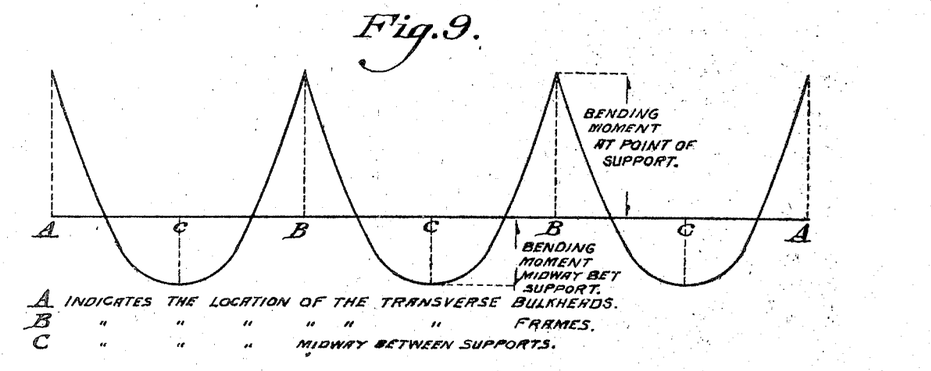
Figs. 9, 10 and 11 represent diagrammatic views, showing the location of the transverse bulkheads and transverse frames, showing also diagrammatically various bending moments.
Figures 10, 11:
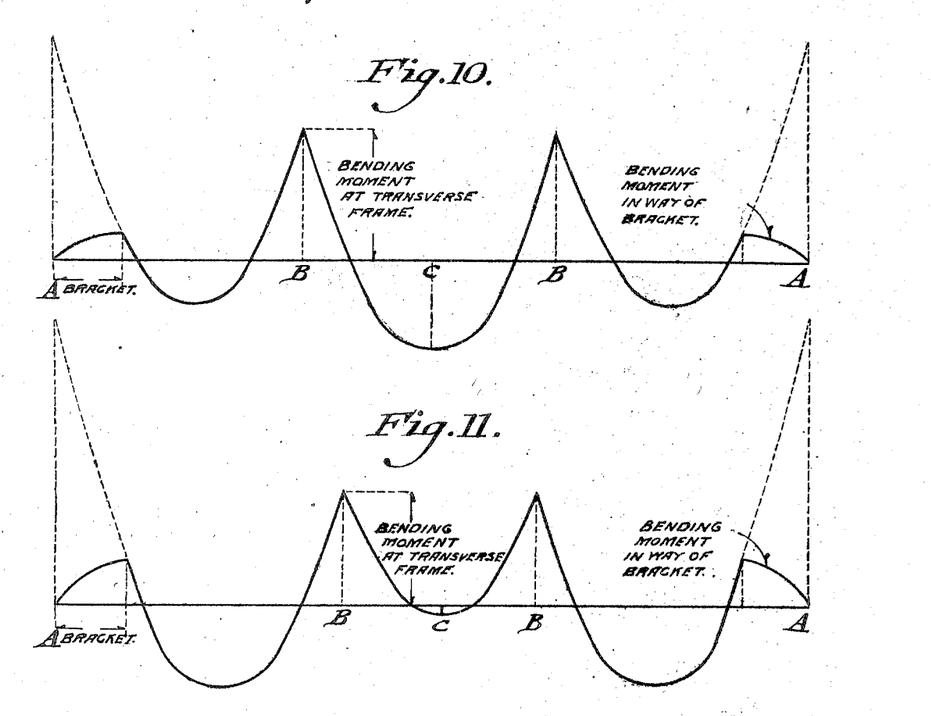

The action of the bracket at the end of the beam, however, is to reduce the span and also to reduce the bending moment in the beam at its attachment to the bracket to less than it would be if the end of the bracket were considered one of the points of support. This latter effect is due to the give of the bracket when the beam is loaded. The bending moments in the end span are therefore much less than at the intermediate points of support. By reducing the spacing between the intermediate supports, the bending moments at the supports may be considerably reduced without causing the bending moments in the longer end spans to become greater than the bending moments at the intermediate supports. By the closer spacing of the intermediate supports, not only are the maximum bending moments in the beam reduced, but the reactions on the intermediate supports are reduced also. The stresses in the end brackets are increased, and account must be taken of that fact in designing the bracket. A similar effect is produced by knees formed by splitting and opening out the ends of the beam. The change in the values of the bending moments produced by the closer spacing of the intermediate supports is illustrated by Figs. 9, 10 and 11. Fig. 9 shows the relative values of the bending moments when all supports are equally spaced and the beam is continuous without brackets. Fig. 10 shows the relative values of the bending moments when all supports are equally spaced and the beam is bracketed at the end supports. Fig. 11 shows the relative values of the bending moments when the spacing of the intermediate supports is reduced.

In this construction, there may be made a saving in weight of the longitudinals and stiffeners, and also a saving in weight of the transverses and webs with no sacrifice of strength and rigidity. Indeed, on account of the somewhat better connection of the bracket to the bulkhead, the longitudinal strength of the vessel may be somewhat increased if desired, even though the section of the longitudinal is reduced.

Figure 2:
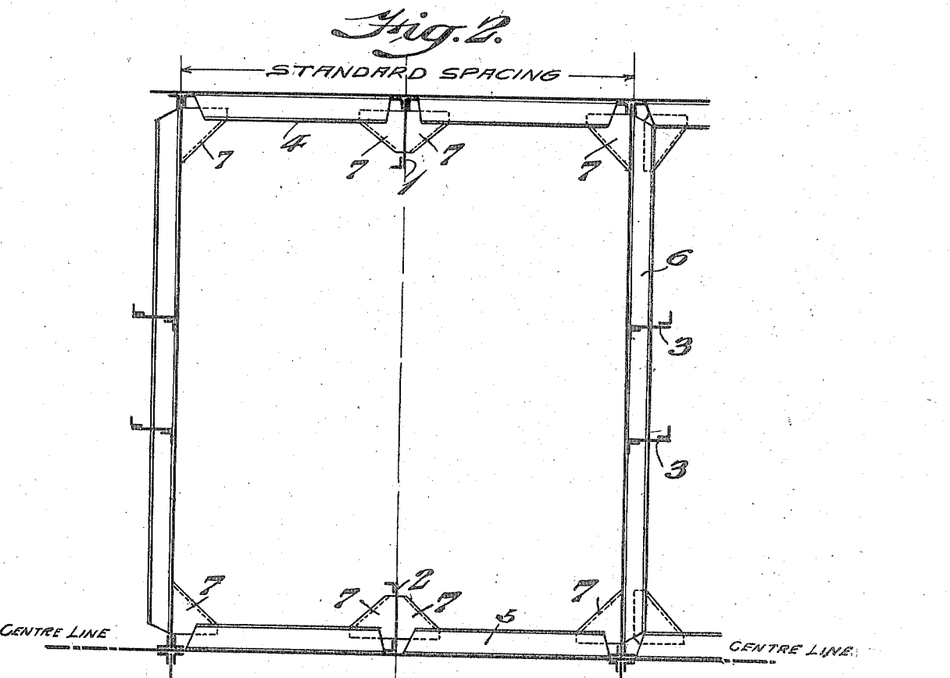
Fig. 2 represents a section taken through a compartment of a vessel embodying my invention showing only one transverse between transverse bulkheads, with the longitudinals bracketed to the transverse as well as to the bulkheads.

The reduction in bending moment caused by the use of the brackets, may be utilized to reduce the number of transverses without making the longitudinals unduly large by bracketing the longitudinals to the transverse as well as to the bulkheads. This construction is illustrated in Fig. 2. The longitudinals may be continuous through the transverses, if desired, but where brackets are fitted, this would seem undesirable. It has been found, for instance, that where two transverses would ordinarily be fitted between bulkheads according to present methods of construction on tank steamers, an equal or better result can be obtained by fitting only one transverse between bulkheads, with the longitudinals bracketed to the transverse as well as to the bulkhead.

Figure 3:
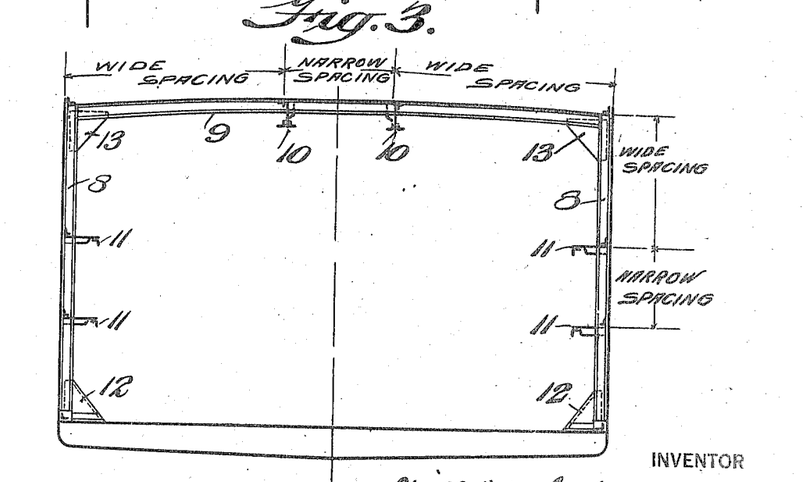
Fig. 3 represents a transverse, vertical section of a vessel having transverse framing built in accordance with my invention, showing the closer spacing of girders under the deck beams and also of stringers supporting the frames.

In vessels having transverse framing, the reduction in bending moment caused by the use of brackets may be utilized to reduce the size of the beams, when the beams are bracketed or kneed at the ends and supported by two or more girders, by making the spacing between the girders less than the distance between the girders and the framing of the shell or bulkhead at which the beams are bracketed or kneed. This construction is illustrated in Fig. 3.

Figure 6:
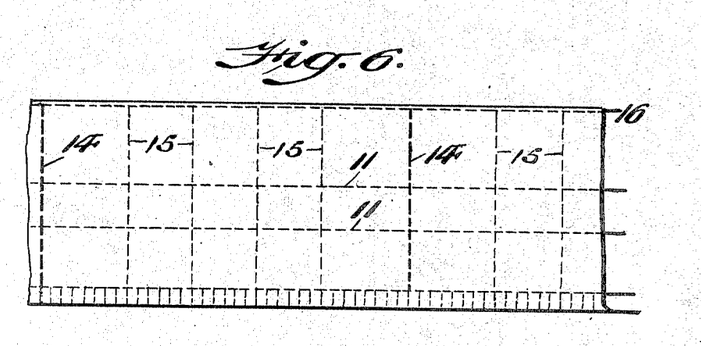
Fig. 6 represents a partial elevation of a vessel embodying my invention having transverse framing and side stringers and web frames.
Figure 7:
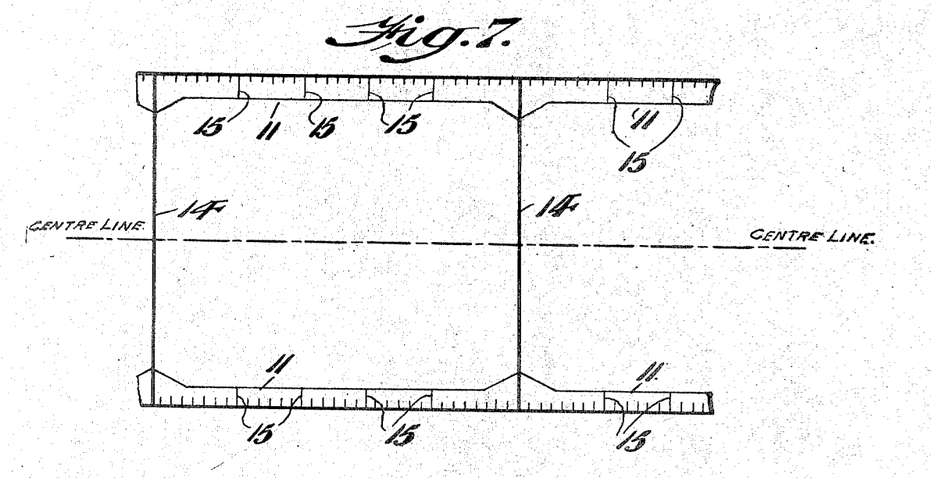
Fig. 7 represents a partial horizontal section of a vessel embodying my invention constructed as seen in Fig. 6.

In vessels having transverse framing, the reduction in bending moment caused by the use of brackets may be utilized to reduce the size of the frames, when the frames are supported by stringers, by adjusting the spacing of the stringers to secure as nearly as practicable uniform stresses in the frames where they cross the stringers and at the ends of the brackets securing the ends of the frames or securing the deck beams to the frames. This construction is illustrated in Fig. 3. Similarly, the size of the stringers and of the web frames supporting the stringers may be reduced by making the spacing between the web frames less than the distance between the web frame and the adjacent bulkhead at which the stringer is bracketed. This construction is illustrated in Figs. 6 and 7.

To the above ends, my invention consists of a novel construction of floating vessel provided with transverses or webs, longitudinal frames, beams and brackets arranged, proportioned and collocated in the novel manner hereinabove described.

For the purpose of illustrating my invention, I have shown in the accompanying drawings, certain forms thereof which are at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts in the figures.

Referring to the drawings:—

Referring first to Fig. 1,—1 designates the transverse frames or transverses, and 2 the web on the center line bulkhead. 3 designates the web on the transverse bulkhead, and 4 designates the longitudinal supported by the transverse and bracketed to the transverse bulkhead.

5 designates stiffeners on the centerline of the bulkhead supported by the webs and bracketed to the transverse bulkheads. 6 designates stiffeners on the transverse bulkheads supported by the webs and bracketed at one end to the shell and at the other end to the centerline bulkhead.

7 designates the brackets located at the ends of the longitudinal or stiffener, it being noticed that the spacing between transverses or webs is appreciably less than the spacing between a transverse and bulkhead or between a web and bulkhead or shell.

In the construction shown in Fig. 2, the general arrangement and collocation of the parts hereinbefore mentioned will be readily understood, where I have shown only one transverse between transverse bulkheads with the longitudinals bracketed to the transverse as well as to the bulkheads; it will be apparent that the spacing of the bulkheads is not reduced on this account, although the rigidity of the longitudinal frame may be slightly reduced if the longitudinal is not increased in size.

In the construction shown in Fig. 3, I have shown a cross-section through a vessel having transverse framing embodying my invention, showing the closer spacing of the girders under the deck beams and of the stringers supporting the frames, wherein 8 designates the transverse frame, 9 the transverse deck beam, 10 the girders supporting the deck beam, 11 the stringers supporting the frame, 12 the brackets at the heel of the frame, and 13 the brackets at the ends of the deck beam.

It is apparent that the proportionate spacing of the transverses and webs and the details of the bracket connections may be altered as considered desirable to suit conditions, without departing from the spirit of my invention, provided uniform spacing is departed from.

Figure 4:
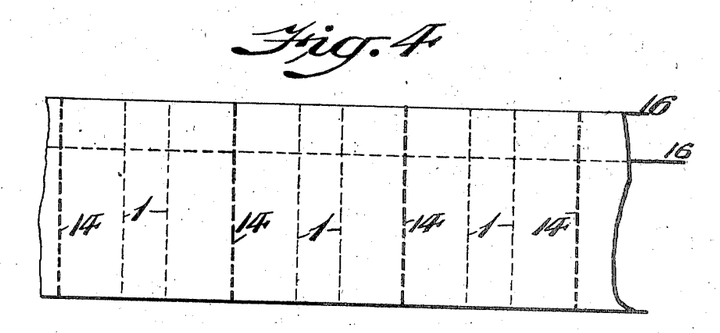
Fig. 4 represents a partial side elevation of a vessel embodying my invention, having longitudinal framing and two transverses between transverse bulkheads.

In the construction shown in Fig. 4, which is a partial elevation of a vessel embodying my invention, having longitudinal framing and two transverses between transverse bulkheads, I have designated the transverses as 1, while 14 designates the bulkheads and 16 the decks.

Figure 5:
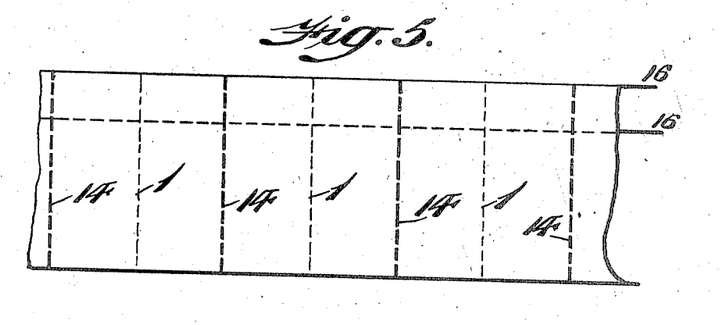
Fig. 5 represents a partial side elevation of a vessel embodying my invention, having longitudinal framing and a single transverse between transverse bulkheads.

In the construction seen in Fig. 5, which is a partial elevation of a vessel embodying my invention, having longitudinal framing and a single transverse between transverse bulkheads, 1 indicates transverses, 14 the bulkheads and 16 the decks.

In Figs. 6 and 7, which represent a partial elevation and a partial horizontal section of a vessel embodying my invention, having transverse framing and side stringers and web frames, 11 indicates the stringers supporting the frames, 14 the transverse bulkheads, 15 the webs worked in conjunction with the stringers 11, as shown, and 16 the deck.

It will be seen from the foregoing and from Fig. 1 that I make the spacing between a bulkhead or transverse at which the longitudinal is bracketed and the adjacent transverse, greater that the spacing between transverses at which the longitudinals are not bracketed, whereby the maximum stresses in the longitudinals are reduced and the size and weight of the longitudinals are decreased.

Furthermore, where the spacing of bulkheads is such that only two transverses will be fitted between them, I make the distance between the two transverses less than one-third the distance between the bulkheads. This construction is illustrated in Fig. 1.

In practice, about one-fourth the distance between the bulkheads will be found a suitable distance, although an even smaller proportionate distance may be used, if the end brackets are suitably increased, the same relatively wider spacing being used on transverse bulkheads between the web supporting the stiffeners and the shell plating or longitudinal bulkhead at which the stiffeners are bracketed. This construction is illustrated in Fig. 1.

It will be apparent to those skilled in the art, that by the foregoing construction there is a saving in weight of the longitudinals and stiffeners and also a saving in weight of the transverses and webs with no sacrifice of strength and rigidity, and on account of the somewhat better connection of the bracket to the bulkhead, the longitudinal strength of the vessel may be somewhat increased, even although the section of the longitudinal is reduced.

It will be apparent to those skilled in the art that in vessels having transverse framing, the reduction in bending moment caused by the use of brackets may be utilized to reduce the size of the beams when the beams are bracketed at the ends and supported by two or more girders, by making the distance between the girders less than the distance between the girders and the shell or bulkhead at which the beams are bracketed or kneed. This construction is illustrated in Fig. 3.

It will be apparent to those skilled in the art that in vessels having transverse frames, the reduction in bending moment caused by the use of brackets, may be utilized to reduce the size of the frames when the frames are supported by stringers, by adjusting the spacing of the stringers to secure as nearly as practicable uniform stresses in the frames where they cross the stringers and at the ends of the brackets securing the ends of the frames or securing the deck beams to the frames. This construction is illustrated in Fig. 3. Similarly, the size of the stringers and of the web frames supporting the stringers may also be reduced by making the spacing between the web frames less than the distance between the web frame and the adjacent bulkhead to which the web frame is bracketed. This construction is illustrated in Figs. 6 and 7.

My invention, which is applicable to the whole or any part of a vessel which may be used for carrying a liquid or any other kind of cargo, irrespective of whether the vessel is self-propelled, or towed, or, if self-propelled, whether coal or liquid fuel is used, or whether or not the vessel carries passengers, or is used for governmental purposes,—is differentiated from the construction of the Isherwood Patent No. 1,029,546, wherein are employed consecutive transverse frames, inasmuch as my invention is designed not only to cover transverse members having unequal spacing as seen in Figs. 1 and 4, which unequal spacing is rendered possible and advisable by the fact that certain of the transverse members which I employ are of a different construction from the others and have the longitudinal frames connected to them by brackets, but also to cover the employment of transverse frames alternating with bulkheads as seen in Figs. 2 and 5, so that I in no case employ transverse frames of the consecutive character specified in the patent aforesaid, and my invention is consequently differentiated therefrom, the preferred collocation or spacing of the various elements being understood from Figs. 1, 2, 4 and 5.

In accordance with the accepted Isherwood practice developed in conjunction with *Lloyd's Register of Shipping*, the transverse bulkheads on vessels intended for carrying oil in bulk are spaced about 28 feet apart, and two transverses are fitted between bulkheads, the spacing between the two transverses and between the transverses and the bulkheads being the same, i. e., one-third of 28 feet, the longitudinals being carried from bulkhead to bulkhead through slots in the outer edges of the transverses and being bracketed to the bulkheads, I have found that if the distance between the two transverses is made about one-quarter of the distance between the bulkheads, and the distance between the bulkhead and the nearest transverse is increased accordingly to about three-eighths the distance between bulkheads, the stresses on the longitudinals are reduced about 10% and the load carried by the transverses is also reduced about 10%. This reduction in the stresses on the longitudinal and in the load on the transverses enables the size of both the longitudinals and transverses to be reduced and still maintain the same factor of safety in the construction. With the two transverses spaced nearer the center of the oil tank, however, the brackets connecting the longitudinals to the bulkheads would need to be somewhat stronger than when the transverses are equally spaced in order to obtain the same factor of safety. This construction is illustrated in Fig. 1.

It will be further apparent that I may employ slots in the transverse frames through which the longitudinal frames pass, or I may employ brackets instead of slots, with a view of reducing the scantling of the longitudinal frames. In the last mentioned construction, I have referred to the possibility of employing brackets at the transverse frames as well as at the transverse bulkheads, which method of framing is illustrated best by Fig. 2, in which the number of transverse frames between bulkheads is reduced to one. The same method of framing can be used with two or more intermediate frames and the size of the longitudinal frames will be determined by the maximum bending moment to which it is subjected, which maximum bending moment would be very much less than would be obtained by calculations which do not allow for the great reduction in bending moment in the longitudinal frame which occurs by reason of the support afforded by the bracket.

It will be further apparent to those skilled in the art, that in the broad aspect of my invention, these mechanical principles apply with novelty to the following constructions:—

Figure 8:
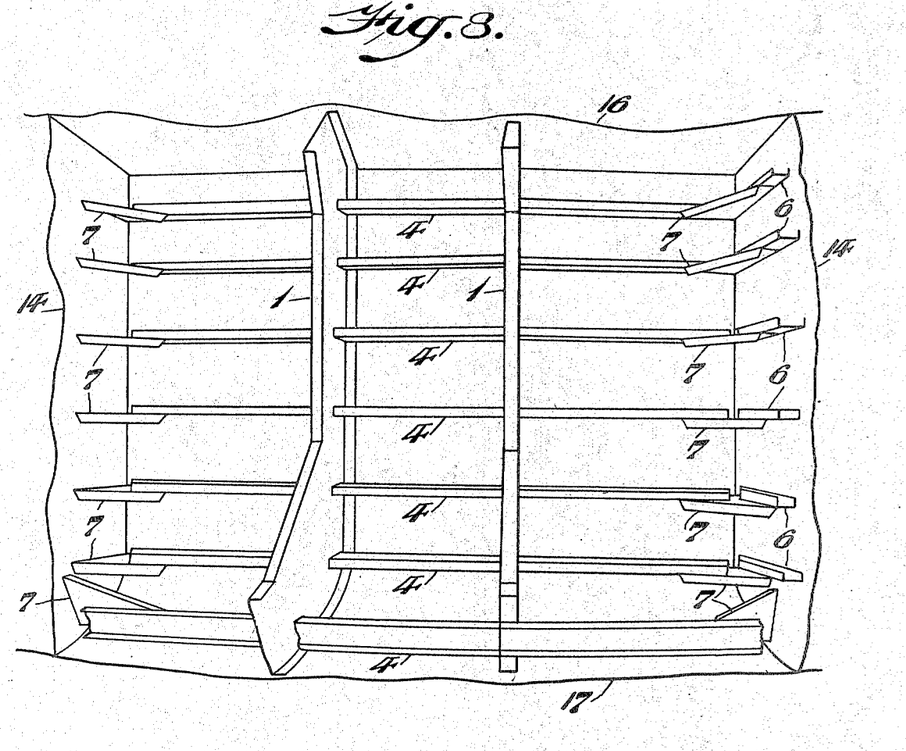
Fig. 8 represents a perspective of a compartment on a vessel embodying my invention, showing two transverses between transverse bulkheads.

1st, longitudinally framed vessels in which the longitudinal frames are continuous through two or more transverse frames and connected to brackets attached to transverse bulkheads, as will be understood from Figs. 1, 4 and 8.

2nd, longitudinally framed vessels in which the transverse bulkheads are so close together that one intermediate transverse frame only need be fitted between transverse bulkheads, as will be understood from Figs. 2 and 5.

3rd, transversely framed vessels in which the transverse frames are supported by two or more stringers and connected to the inner bottom and deck by brackets, as will be understood from Figs. 3, 6 and 7.

4th, transversely framed vessels in which the stringers are supported by two or more web frames and connected to transverse bulkheads by brackets, as will be understood from Figs. 6 and 7.

5th, transversely framed vessels in which the deck beams are supported by two or more girders and connected to the frames by brackets, as will be understood from Fig. 3.

It will now be apparent that I have devised a novel and useful floating vessel which embodies the features of advantage enumerated as desirable, and that while I have in the present instance shown and described preferred embodiments of it which have in practice been found to give satisfactory and reliable results, it is to be understood that the invention is susceptible of modification in various particulars without departing from the spirit or scope of the invention or sacrificing any of its advantages.

Having thus described my invention, what I claim as new and desire to secure by Letters Patent is:—

1. In a vessel, a plurality of transverses or webs, longitudinal frames, beams or stiffeners extending through said transverses or webs and supported thereby, bulkheads, and a bracket common to certain of said longitudinals or stiffeners and bulkheads, the spacing of said transverses or webs being greater for the bay in which the bracket occurs than where the longitudinal or stiffener is not supported by a bracket.

2. In a vessel, a plurality of transverses or webs, longitudinal frames, beams or stiffeners supported by the latter, and brackets common to said longitudinals or stiffeners and the transverses or webs, whereby a wider spacing of said transverses or webs is enabled to be used than would be proper with the same size of longitudinals unsupported by brackets.

3. In a vessel, a plurality of comparatively closely spaced transverse bulkheads, longitudinal frames, beams or stiffeners bracketed to said bulkheads, and an intermediate transverse or web to which said longitudinal frames, beams or stiffeners are also bracketed.

4. In a vessel, a plurality of transverse members, and longitudinal frames supported by said transverse members, through some of which latter said frames pass continuously without brackets, and at others of which said frames are cut and bracketed to said transverse members, the spacing between said transverse members through which the frames pass continuously without bracketing being less than the distance between such member and the adjacent transverse member at which the frames are bracketed, whereby the weight of the structure is safely reduced over what is required if the spacing of the transverse members is not so arranged.

5. In a vessel, a plurality of transverse members, and longitudinal frames and beams supported by said transverse members, through some of which latter said frames and beams pass continuously without brackets, and at others of which said frames and beams are cut and bracketed to said transverse members, the spacing between the transverse members through which said frames and beams pass continuously without bracketing being less than the distance between such member and the adjacent transverse member at which said frames and beams are bracketed, whereby the weight of the structure is safely reduced over what is required if the spacing of the transverse members is not so arranged.

6. In a vessel, a plurality of transverse members, longitudinal frames supported by said transverse members, and brackets common to said frames and members, the spacing of said transverse members being greater than is generally customary, without such an increase in the size of the longitudinal frames corresponding to the increased spacing of the transverse members as would be required to secure satisfactory strength if the longitudinal frames were not connected to the transverse members by brackets.

7. In a vessel, a plurality of transverse members, longitudinal frames and beams supported by said transverse members, and brackets common to said frames and beams and transverse members, the spacing of said transverse members being greater than is generally customary without such an increase in the size of the longitudinal frames and beams corresponding to the increased spacing of the transverse members, as would be required to secure satisfactory strength if the longitudinal frames and beams were not connected to the transverse members by brackets.

8. In a vessel, one or more bulkheads constructed with closely spaced stiffeners, two or more widely spaced webs supporting said stiffeners, the latter passing continuously without brackets through said webs, and brackets supporting said stiffeners at their ends, said brackets being attached to suitable framing, on which bulkhead the spacing between the webs through which the stiffeners pass continuously is less than the distance between said webs and the supports at which the stiffener is bracketed, whereby the weight of the structure is reduced over what is required if the spacing between the webs is made the same as between the webs and the end structure supporting said stiffeners.

9. In a vessel, a portion thereof constructed with longitudinal frames and transverse members supporting said frames, said frames passing through some of said transverse members continuously without brackets, and at others of which said frames are cut and bracketed to said transverse members, the spacing between said transverse members through which said frames pass continuously without bracketing being less than the distance between such member and the adjacent transverse member at which the frames are bracketed, whereby the weight of the structure is safely reduced over what is required if the spacing of the transverse members is not so arranged.

10. In a vessel, a portion thereof constructed with longitudinal frames and beams and transverse members supporting said frames and beams, through some of which transverse members said frames and beams pass continuously without brackets, and at others of which said frames and beams are cut and bracketed, the spacing between said transverse members through which said frames and beams pass continuously without bracketing being less than the distance between such member and the adjacent transverse member at which said frames and beams are bracketed, whereby the weight of the structure is safely reduced over what is required if the spacing of the transverse members is not so arranged.

11. In a vessel, a portion thereof constructed with longitudinal frames, transverse members supporting said longitudinal frames, and brackets for connecting said frames to said transverse members, the spacing of said transverse members being greater than is generally customary without such an increase in the size of the longitudinal frames corresponding to the increased spacing of the transverse members as would be required to secure satisfactory strength if the longitudinal frames were not connected to the transverse members by brackets.

12. In a vessel, a portion thereof constructed with longitudinal frames and beams, transverse members supporting said frames and beams, and brackets for connecting said frames and beams to said transverse members, the spacing of said transverse members being greater than is generally customary without such an increase in the size of the longitudinal frames and beams corresponding to the increased spacing of the transverse members as would be required to secure satisfactory strength if the longitudinal frames and beams were not connected to the transverse members by brackets.

13. In a vessel, one or more decks constructed with closely spaced beams, a plurality of girders for supporting said beams, the former passing continuously through said girders without knees or brackets, brackets or knees for supporting the ends of said beams, said brackets being attached to the framing of the shell or bulkheads, the spacing between said girders below said deck being less than the distance between said girders and the shell or bulkhead at which said beams are bracketed or kneed, whereby the weight of the structure is reduced over what is required if the spacing between the girders is made the same as the distance between the girders and the shell or bulkhead.

14. In a vessel, transverse frames, stringers for supporting certain of said frames, and brackets for securing the ends of said frames, the spacing of said stringers being adjusted to secure as nearly as practicable uniform stresses in the frames where they cross said stringers and at the ends of said brackets securing the ends of the frames or securing the deck beams to the frames, whereby the weight of the structure is reduced over what is required if the spacing of the stringers is not so adjusted.

15. In a vessel, a plurality of transverse frames, stringers for supporting certain of said frames, web frames for supporting said stringers, and bulkheads to which said stringers are bracketed, the spacing between said web frames being less than the distance between the web frames and the adjacent bulkhead to which said stringer is bracketed, whereby the weight of the structure is reduced over what is required if the spacing between the web frames is made the same as the distance between the web frames and the bulkheads.

WILLIAM GATEWOOD.

Witnesses:
E. FINNIS HEATH,
HAROLD F. NORTON.